United States Patent
Itoo et al.

(10) Patent No.: US 11,644,094 B2
(45) Date of Patent: May 9, 2023

(54) POWER UNIT

(71) Applicant: KAWASAKI MOTORS, LTD., Akashi (JP)

(72) Inventors: Seiji Itoo, Akashi (JP); Ayumi Hamada, Kakogawa (JP); Nobuyuki Nishiguchi, Kobe (JP)

(73) Assignee: KAWASAKI MOTORS, LTD., Akashi (JP)

( * ) Notice: Subject to any disclaimer, the term of this patent is extended or adjusted under 35 U.S.C. 154(b) by 388 days.

(21) Appl. No.: 16/750,645

(22) Filed: Jan. 23, 2020

(65) Prior Publication Data
US 2021/0231211 A1 Jul. 29, 2021

(51) Int. Cl.
| F16H 57/04 | (2010.01) |
| F16H 61/662 | (2006.01) |
| B60K 17/08 | (2006.01) |
| F16H 57/027 | (2012.01) |
| B60K 13/06 | (2006.01) |
| F16H 55/36 | (2006.01) |
| F16H 61/66 | (2006.01) |

(52) U.S. Cl.
CPC ......... *F16H 57/0489* (2013.01); *B60K 13/06* (2013.01); *B60K 17/08* (2013.01); *F16H 57/027* (2013.01); *F16H 57/0416* (2013.01); *F16H 61/66236* (2013.01); *B60Y 2400/302* (2013.01); *B60Y 2400/72* (2013.01); *F16H 55/36* (2013.01); *F16H 61/662* (2013.01); *F16H 2061/6607* (2013.01)

(58) Field of Classification Search
CPC ......... F16H 61/66272; F16H 61/66259; F16H 61/0021; F16H 61/662; F16H 57/0489; F16H 63/50; F16H 61/12; F16H 2061/1208; F16H 57/01; F16H 9/18; F16H 57/0416; F16H 59/72; F16H 2057/014; F16H 2061/6629
USPC ............................................... 474/8, 18, 28
See application file for complete search history.

(56) References Cited

U.S. PATENT DOCUMENTS

| 7,402,118 | B2* | 7/2008 | Kimura | F16H 61/66254 474/18 |
| 7,699,729 | B2* | 4/2010 | Inoue | F16H 61/66259 474/18 |
| 8,613,336 | B2* | 12/2013 | Deckard | F16H 57/0416 180/68.3 |
| 2001/0044349 | A1* | 11/2001 | Tanigawa | F16H 55/56 474/18 |
| 2001/0044350 | A1* | 11/2001 | Nishigaya | F16H 63/065 474/18 |
| 2001/0045221 | A1* | 11/2001 | Soga | F16H 61/0021 475/116 |

(Continued)

*Primary Examiner* — Henry Y Liu
(74) *Attorney, Agent, or Firm* — Alleman Hall Creasman & Tuttle LLP

(57) ABSTRACT

A power unit includes a prime mover and a belt continuously variable transmission. The belt continuously variable transmission includes a drive pulley, a driven pulley, a belt wound around the drive pulley and the driven pulley, and a housing forming an accommodation space in which the belt is disposed. The belt continuously variable transmission changes a speed of rotation produced by drive power output from the prime mover. The power unit further includes a temperature sensor configured to detect a temperature of the belt or a temperature corresponding to the temperature of the belt.

9 Claims, 6 Drawing Sheets

(56) References Cited

U.S. PATENT DOCUMENTS

| | | | |
|---|---|---|---|
| 2005/0192131 A1* | 9/2005 | Yamamoto | F16H 61/66272 474/18 |
| 2006/0069486 A1* | 3/2006 | Yamaguchi | F16H 61/66259 701/56 |
| 2006/0172829 A1* | 8/2006 | Ishio | F16H 61/66272 474/18 |
| 2006/0276279 A1* | 12/2006 | Suzuki | F16H 61/66259 474/8 |
| 2007/0082769 A1* | 4/2007 | Nihei | F16H 61/66272 474/8 |
| 2007/0082770 A1* | 4/2007 | Nihei | F16H 61/66259 474/18 |
| 2007/0197320 A1* | 8/2007 | Kimura | F16H 61/66259 474/18 |
| 2007/0255476 A1* | 11/2007 | Takamatsu | F16H 61/66259 701/78 |
| 2009/0082172 A1* | 3/2009 | Mori | F16H 61/66272 477/46 |
| 2010/0248874 A1* | 9/2010 | Katou | F16H 61/66272 474/28 |
| 2014/0262584 A1* | 9/2014 | Lovold | B60K 17/354 180/246 |
| 2017/0276234 A1* | 9/2017 | Kuji | F16H 57/0489 |
| 2018/0211454 A1* | 7/2018 | Carlson | B60W 50/0205 |
| 2019/0316532 A1* | 10/2019 | Houle | F16H 9/18 |

\* cited by examiner

POWER UNIT

BACKGROUND OF THE INVENTION

Field of the Invention

The present disclosure relates to a power unit including a belt continuously variable transmission.

Description of the Related Art

U.S. Pat. No. 8,613,336 discloses a utility vehicle configured to travel on uneven terrains. In a common utility vehicle, a power unit including an engine and a continuously variable transmission (CVT) is mounted in the vehicle body. The CVT employs a belt for power transmission. To the accommodation space inside the housing of the CVT there are connected an intake passage through which air drawn from the outside flows to cool the belt and an exhaust passage through which the air heated after cooling of the belt is discharged to the outside.

Once a filter disposed in the intake passage becomes clogged, the flow rate of air delivered toward the belt is reduced, and cooling of the belt becomes insufficient. When the vehicle is continuously operated at a high speed on a terrain which imposes a high load on the vehicle (such as an upward slope or a sandy area), the torque transmitted to the belt is converted to thermal energy, with which the belt is heated. When the vehicle becomes stuck, for example, on a mud road, and is continuously operated at a high output to leave the stuck state, the belt slides against the pulley and is heated. Heating of the belt to a high temperature shortens the service life of the belt, thus increasing the number of times of belt replacement.

SUMMARY OF THE INVENTION

A power unit according to one aspect of the present disclosure includes: a prime mover; a belt continuously variable transmission including a drive pulley, a driven pulley, a belt wound around the drive pulley and the driven pulley, and a housing forming an accommodation space in which the belt is disposed, the belt continuously variable transmission being configured to change a speed of rotation produced by drive power output from the prime mover; and a temperature sensor configured to detect a temperature of the belt or a temperature corresponding to the temperature of the belt.

The above configuration allows the user to know whether the belt of the belt continuously variable transmission is overheated, thus prompting the user to take measures to prevent a reduction in service life of the belt.

DETAILED DESCRIPTION OF THE EMBODIMENTS

Hereinafter, an embodiment will be described with reference to the drawings.

Figure 1:
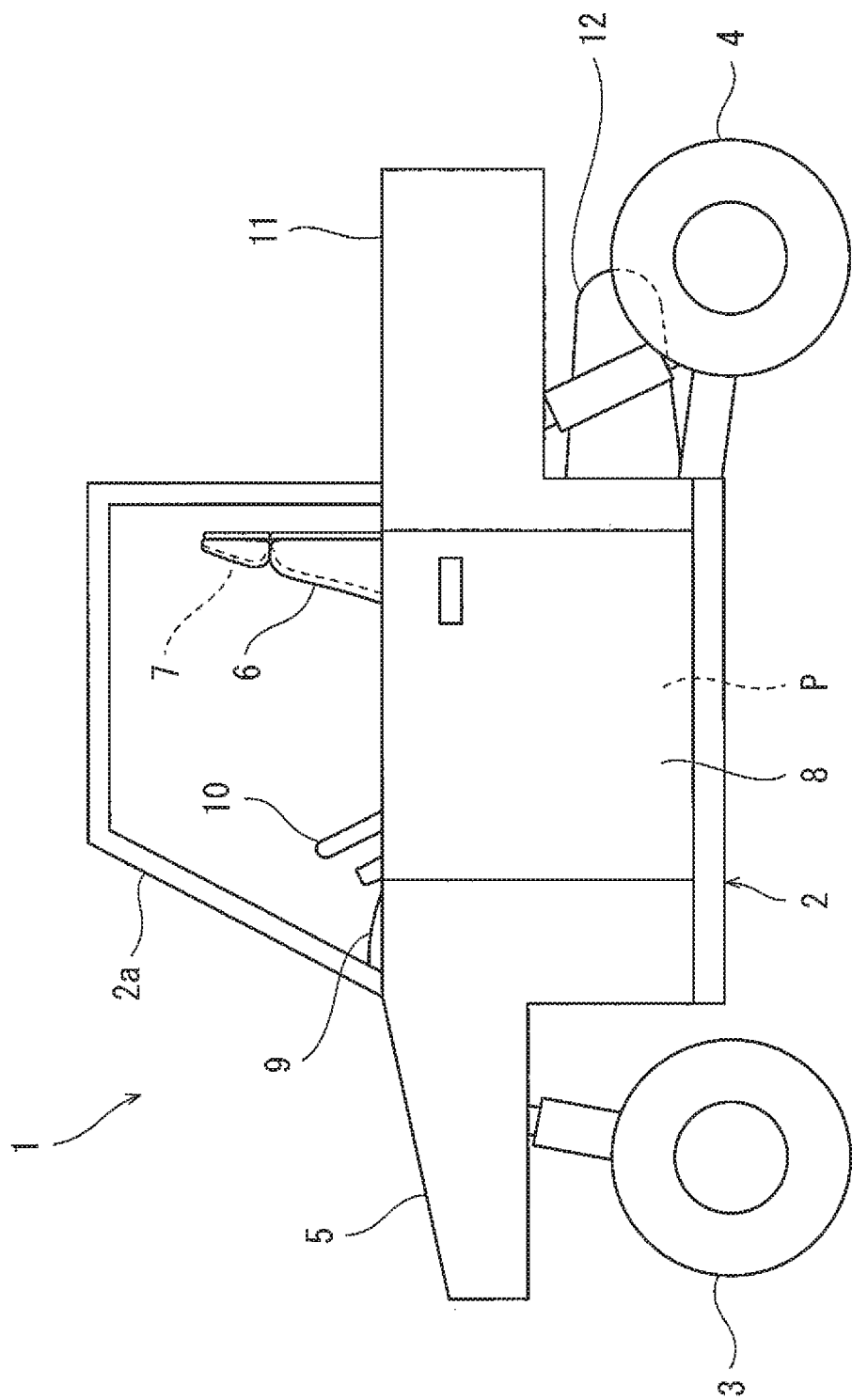
FIG. 1 is a schematic left side view of a utility vehicle according to an embodiment.

FIG. 1 is a left side view schematically showing a utility vehicle 1 according to the embodiment. As shown in FIG. 1, the utility vehicle 1 includes a vehicle body frame 2, a pair of left and right front wheels 3 supporting a front portion of the vehicle body frame 2, and a pair of left and right rear wheels 4 supporting a rear portion of the vehicle body frame 2. The tires of the front and rear wheels 3 and 4 are balloon tires for travel on uneven terrains. The space between the left and right front wheels 3 is covered from above by a hood 5 made of resin. A driver seat 6 and a passenger seat 7 supported by the vehicle body frame 2 are disposed rearward of the hood 5 and arranged side-by-side.

The vehicle body frame 2 is a pipe frame constituted by a plurality of pipes connected together. The vehicle body frame 2 includes a cabin frame 2a surrounding a vehicle interior space in which the driver seat 6 and the passenger seat 7 are disposed. On the left of the driver seat 6 there is provided a driver seat-side boarding opening P closable by a side door 20. Likewise, on the right of the passenger seat 7 there is provided a passenger seat-side boarding opening closable by a side door. The vehicle interior space surrounded by the cabin frame 2a is exposed to the outside environment. A dash panel 9 is disposed forward of the driver seat 6 and the passenger seat 7. A handle device 10 is mounted on the dash panel 9 and projects toward the driver seat 6.

A loading bed 11 forming a recessed load-carrying space open to the outside environment is provided rearward of the cabin frame 2a. A power unit 12 is mounted below the loading bed 11. The power unit 12 outputs rotational power for driving drive wheels. When the utility vehicle 1 is a two-wheel-drive vehicle, the rear wheels 4 are the drive wheels. When the utility vehicle 1 is a four-wheel-drive vehicle, the front and rear wheels 3 and 4 are the drive wheels.

Figure 2:
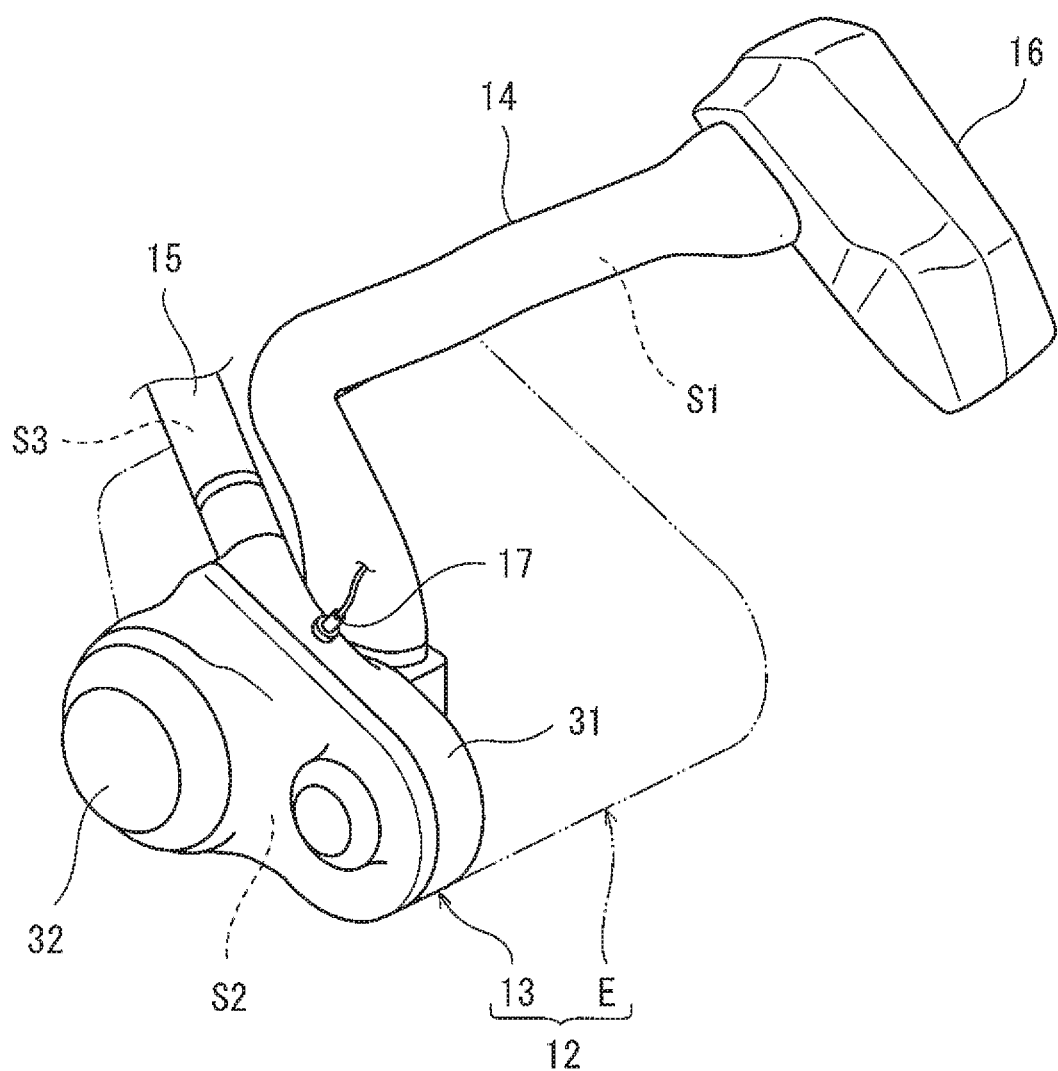
FIG. 2 is a left rear perspective view of a power unit of the utility vehicle of FIG. 1 and the vicinity of the power unit.

FIG. 2 is a left rear perspective view of the power unit 12 of the utility vehicle 1 of FIG. 1 and the vicinity of the power unit 12. As shown in FIG. 2, the power unit 12 includes an engine E configured as an internal combustion engine and a belt continuously variable transmission 13 configured to change the speed of rotation produced by rotational power output from the engine E. An electric motor may be used as a prime mover instead of the engine. The belt continuously variable transmission 13 includes a housing 21. The housing 21 includes a housing body 31 and a cover 32. The housing body 31 has an opening facing laterally and is secured to the engine E. The cover 32 is removably mounted on the housing body 31 so as to close the opening of the housing body 31.

An intake duct 14 and an exhaust duct 15 are connected to the housing 21 of the belt continuously variable transmission 13. An air cleaner 16 is provided at the inlet of the intake duct 14, and the air cleaner 16 includes a filter for cleaning outside air drawn by the action of negative pressure. In particular, the intake and exhaust ducts 14 and 15 are connected to the housing body 31. Thus, the cover 32 is independent and separate from the intake and exhaust ducts 14 and 15.

An intake passage S1 of the intake duct 14, an accommodation space S2 inside the housing 21 of the belt continuously variable transmission 13, and an exhaust passage S3 of the exhaust duct 15 constitute a cooling passage C. A temperature sensor 17 is mounted on the housing 21 of the belt continuously variable transmission 13 to measure the temperature of air inside the accommodation space S2. In particular, the temperature sensor 17 is mounted on the housing body 31. The temperature sensor 17 detects the temperature of air with which a detection portion 17a (see FIG. 5) contacts. The temperature measured by the temperature sensor 17 varies with changes in the temperature of a belt 26 (see FIG. 3) of the belt continuously variable transmission 13.

Figure 3:
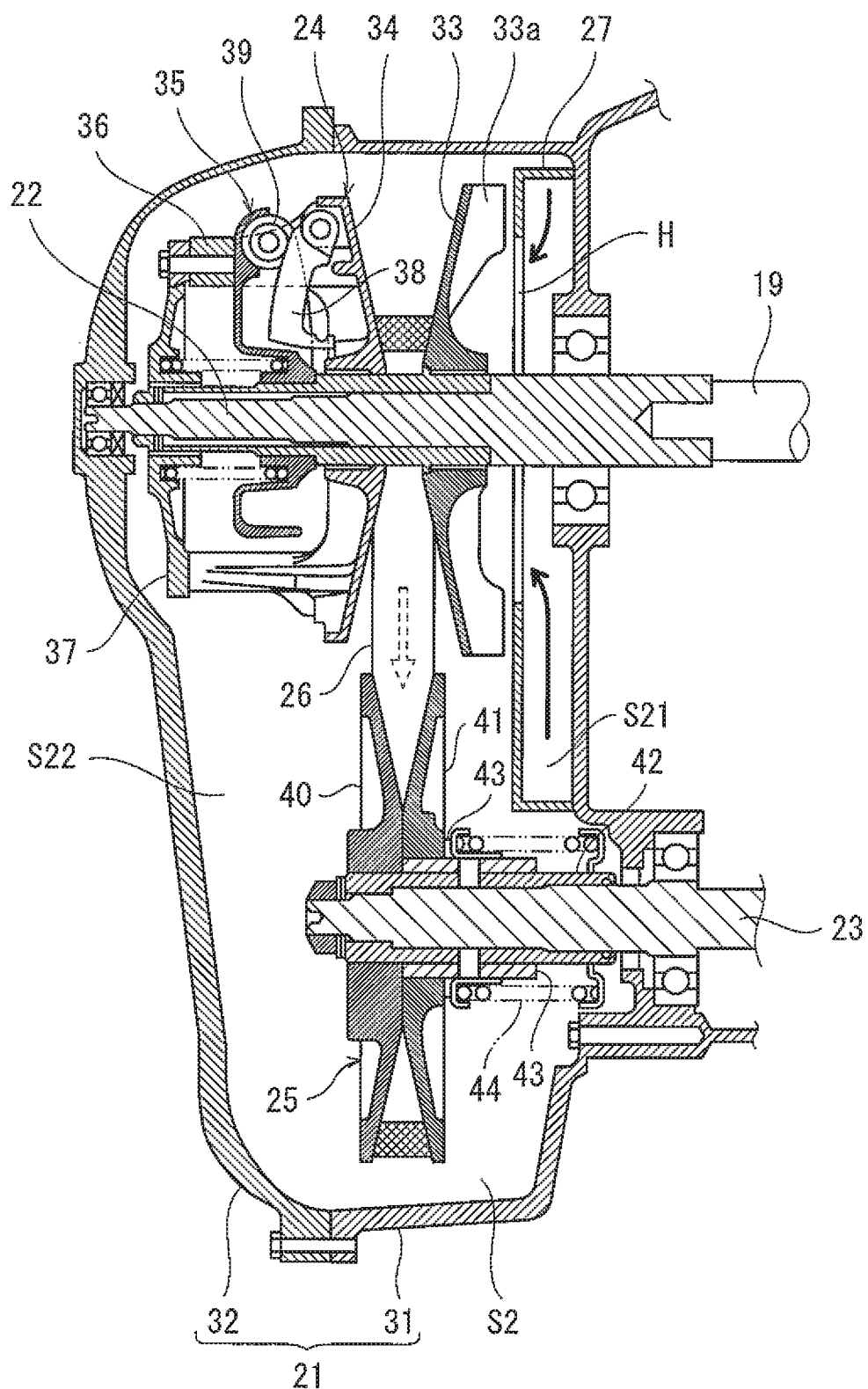
FIG. 3 is a horizontal cross-sectional view of a belt continuously variable transmission shown in FIG. 2.

FIG. 3 is a horizontal cross-sectional view of the belt continuously variable transmission 13 shown in FIG. 2. As shown in FIG. 3, the belt continuously variable transmission 13 includes an input shaft 22 connected to a crankshaft 19 of the engine E to receive rotational power input from the engine E and an output shaft 23 configured to output rotational power toward the drive wheels (toward a propeller shaft). While in FIG. 3 the crankshaft 19 and input shaft 22 are coupled directly, a centrifugal clutch may be interposed between the crankshaft 19 and input shaft 22.

A drive pulley 24 is mounted on the input shaft 22, and a driven pulley 25 is mounted on the output shaft 23. A V-shaped belt 26 is wound around the drive pulley 24 and driven pulley 25. The drive pulley 24 includes a stationary sheave 33 secured to the input shaft 22, a movable sheave 34 fitted on the input shaft 22 so as to be axially movable along the input shaft 22, and a sheave thrust force generating mechanism 35 (e.g., a flyweight mechanism). The belt 26 is held between circular conical holding surfaces formed by the stationary sheave 33 and movable sheave 34. As the movable sheave 34 moves along the input shaft 22 to change the distance from the stationary sheave 33, the radial location where the belt 26 is held between the holding surfaces (i.e., the effective diameter of the drive pulley 24) changes.

A backing plate 37 is coupled to the back surface of the movable sheave 34 via a plurality of coupling arms 36 extending outwardly. The backing plate 37 is axially movable along the input shaft 22 together with the movable sheave 34. The sheave thrust force generating mechanism 35 is disposed between the movable sheave 34 and the backing plate 37. In the sheave thrust force generating mechanism 35, a plurality of flyweights 38 pivot away from the movable sheave 34 under the action of centrifugal force to press a pressure-receiving roller 39, and the reaction force against the pressing force causes the movable sheave 34 to move closer to the stationary sheave 33. That is, the sheave thrust force generating mechanism 35 uses the centrifugal force of the rotation of the drive pulley 24 to generate a thrust force acting to reduce the distance between the stationary sheave 33 and the movable sheave 34. On the back surface of the stationary sheave 33 is provided an impeller 33a which generates a swirling flow.

The driven pulley 25 includes a stationary sheave 40 secured to the output shaft 23 and a movable sheave 41 fitted on the output shaft 23 so as to be axially movable along the output shaft 23. For example, a hollow camshaft 42 with spiral cam grooves is secured to the outer circumferential surface of the output shaft 23, and the hollow camshaft 42 and stationary sheave 40 corotate with the output shaft 23. A sleeve 43 is integrally coupled to the inner periphery of the movable sheave 41. The sleeve 43 is fitted on the outer circumferential surface of the hollow camshaft 42 so as to be axially movable along the hollow camshaft 42. The sleeve 43 supports a roller (not illustrated) movable along the cam grooves of the hollow camshaft 42.

The sleeve 43 is biased by a pressure-adjusting spring 44 toward the stationary sheave 40, and the movable sheave 41 is pressed toward the stationary sheave 40. Once the movable sheave 41 is subjected to a rotational force due to the tension of the belt 26, a cam action exerted by the hollow camshaft 42 and roller generates a thrust force acting to bring the movable sheave 41 closer to the stationary sheave 40.

When the input shaft 22 rotates at a low speed, the effective diameter of the drive pulley 24 is small and the effective diameter of the driven pulley 25 is large (the reduction ratio is high). Upon an increase in the rotational speed of the input shaft 22, the increased centrifugal force allows the sheave thrust force generating mechanism 35 to generate a thrust force, by which the movable sheave 34 is moved closer to the stationary sheave 33, thus increasing the effective diameter of the drive pulley 24. Meanwhile, in the driven pulley 25, the tension of the belt 26 and hence the radially inward force applied by the belt 26 are increased, and the movable sheave 41 is moved away from the stationary sheave 40 against the spring force of the pressure-adjusting spring 44 and the cam thrust force of the hollow camshaft 42, thus decreasing the effective diameter of the driven pulley 25.

The interior of the housing 21 includes a dividing wall 27 dividing the accommodation space S2 into a first flow passage S21 and a second flow passage S22. The first flow passage S21 communicates with the intake passage S1 of the intake duct 14 (see FIG. 2). In the second flow passage S22, the drive pulley 24, driven pulley 25, and belt 26 are disposed. The second flow passage S22 communicates with the exhaust passage S3 of the exhaust duct 15 (see FIG. 2). The dividing wall 27 has a portion facing the impeller 33a of the stationary sheave 33 of the drive pulley 24. The dividing wall 27 is provided with an opening H facing a radially inner portion of the impeller 33a of the stationary sheave 33.

Figure 4:
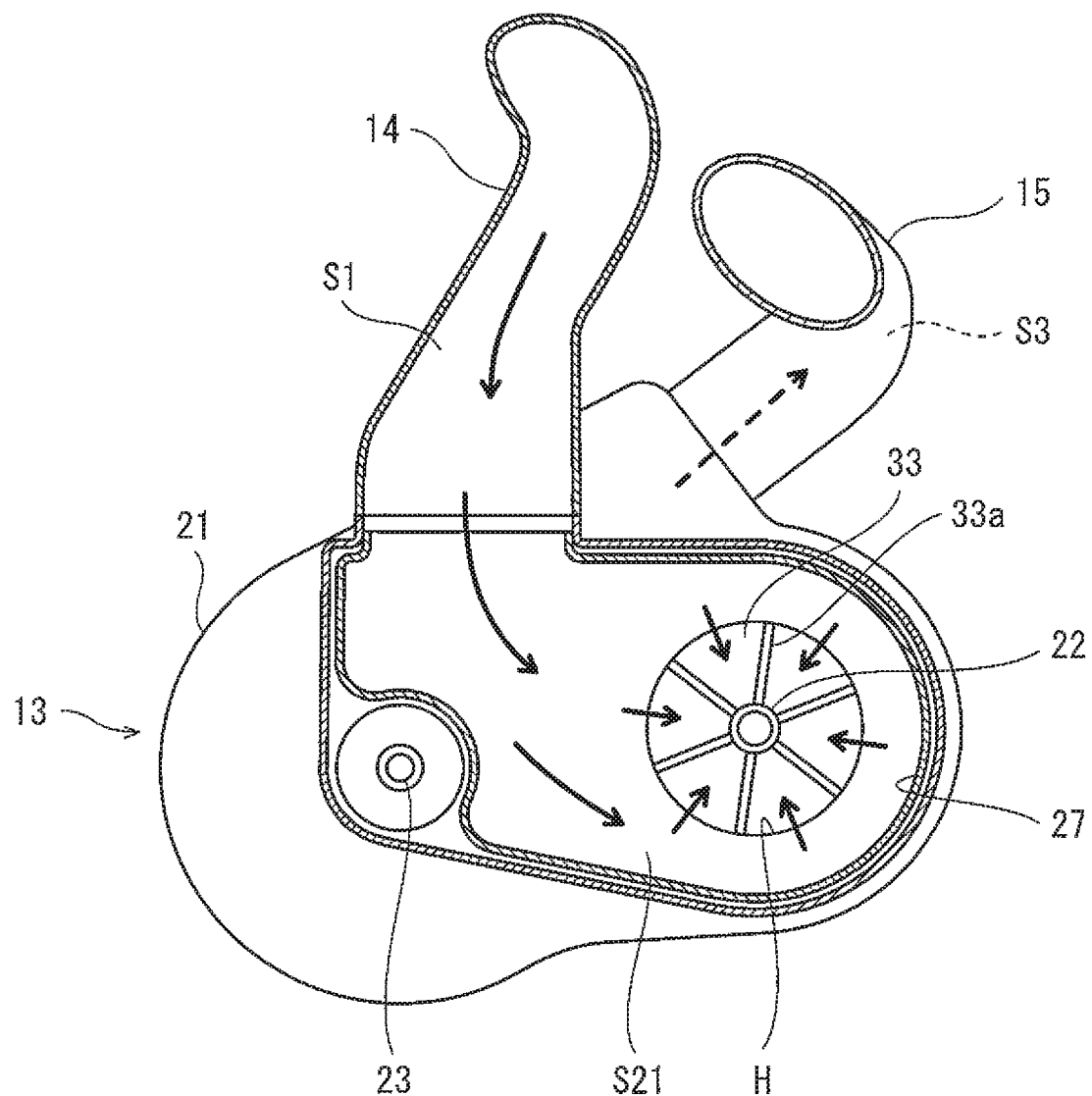
FIG. 4 is a vertical cross-sectional view of the belt continuously variable transmission of FIG. 3, as seen from one side in the vehicle width direction.

FIG. 4 is a vertical cross-sectional view of the belt continuously variable transmission 13 of FIG. 3, as seen from one side in the vehicle width direction. As shown in FIG. 4, when the stationary sheave 33 is rotating, the impeller 33a generates a swirling flow moving toward the radially outer side, and thus air in the first flow passage S21 is drawn toward the radially inner portion of the impeller 33a through the opening H (black arrows in FIG. 4). By the action of the resulting negative pressure, air is delivered from the intake passage S1 of the intake duct 14 to the first flow passage S21 of the belt continuously variable transmission 13.

Figure 5:
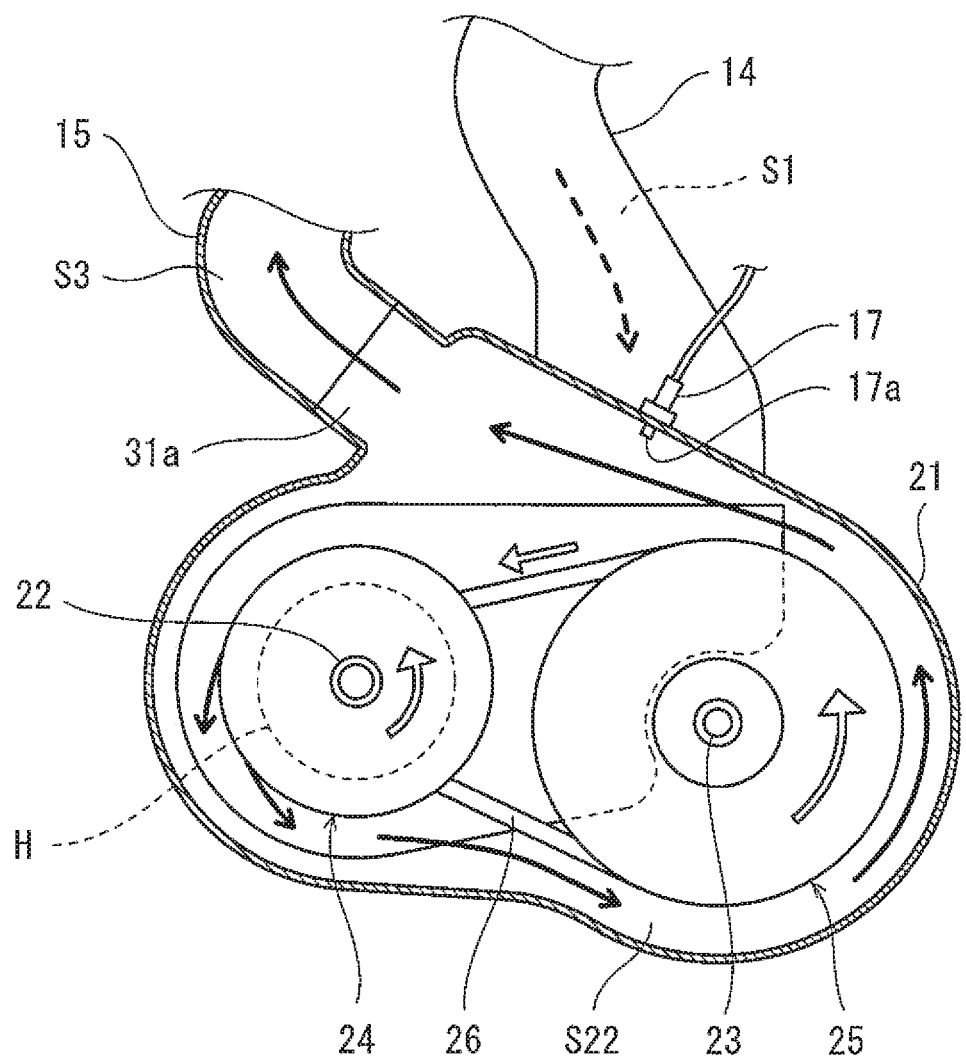
FIG. 5 is a vertical cross-sectional view of the belt continuously variable transmission of FIG. 3, as seen from the other side in the vehicle width direction.

FIG. 5 is a vertical cross-sectional view of the belt continuously variable transmission 13 of FIG. 3, as seen from the other side in the vehicle width direction. As shown in FIG. 5, when the drive pulley 24 is rotating, air flowing into the second flow passage S22 from the first flow passage S21 through the opening H is directed by the impeller 33a (see FIG. 3) of the stationary sheave 33 of the drive pulley 24 toward the radially outer side. In the second flow passage S22, the rotations of the drive pulley 24 and driven pulley 25 (white arrows in FIG. 5) produce a stream of air flowing along the inner peripheral surface of the housing 21 in the same direction as the belt 26 rotates (black arrows in FIG. 5).

The belt 26 is heated as a result of receiving torque from the drive pulley 24 and transmitting the torque to the driven pulley 25. The air which, as viewed in the axial direction of the shafts, flows along the inner peripheral surface of the housing 21 in the second flow passage S22, exchanges heat with the belt 26 to cool the belt 26. The inner peripheral surface of the housing 21 in the second flow passage S22, as viewed in the axial direction of the shafts, is provided with an exhaust port 31a communicating with the exhaust passage S3 of the exhaust duct 15. The air heated as a result of heat exchange with the belt 26 is delivered to the exhaust passage S3 through the exhaust port 31a and discharged to the outside from the exhaust duct 15.

The temperature sensor 17 detects the temperature of air in the second flow passage S22 of the accommodation space S2. The detection portion 17a of the temperature sensor 17 is exposed to the second flow passage S22. Specifically, the temperature sensor 17 detects the temperature of air in a portion of the second flow passage S22, the portion being located downstream of at least a part of the belt 26 in the direction of air flow in the second flow passage S22 (black arrows in FIG. 5).

The detection portion 17a of the temperature sensor 17 is exposed to the second flow passage S22 on the inner peripheral surface of the housing 21, and the location of the detection portion 17a is upstream of the exhaust port 31a in the direction of air flow toward the exhaust port 31a. In particular, the detection portion 17a of the temperature sensor 17 is disposed in proximity to the exhaust port 31a, and the detection portion 17a as viewed from the exhaust port 31a is located in a direction opposite to the direction in which the upper portion of the belt 26 rotates.

In the present embodiment, the exhaust duct 15 is connected to one end of the upper wall of the housing body 31, and the temperature sensor 17 is mounted on a region of the upper wall of the housing body 31, the region being in proximity to the exhaust duct 15 and, as viewed from the exhaust duct 15, being located in a direction opposite to the direction in which the exhaust duct 15 extends from the housing body 31. The outlet of the intake duct 14 and the inlet of the exhaust duct 15, as viewed in the axial direction of the shafts, are away from each other. The temperature sensor 17, as viewed in the axial direction of the shafts, overlaps the intake duct 14.

The temperature sensor 17 may be mounted on the exhaust duct 15, instead of being mounted on the housing 21. The temperature sensor 17 may detect the temperature of the exhaust passage S3. The temperature sensor 17 may be a non-contact temperature sensor, and may measure the temperature of the belt 26 directly. The temperature sensor 17 may measure the temperature of a member (such as the housing 21, exhaust duct 15, or dividing wall 27) thermally connected to air (or a pulley) that exchanges heat with the belt 26.

Figure 6:
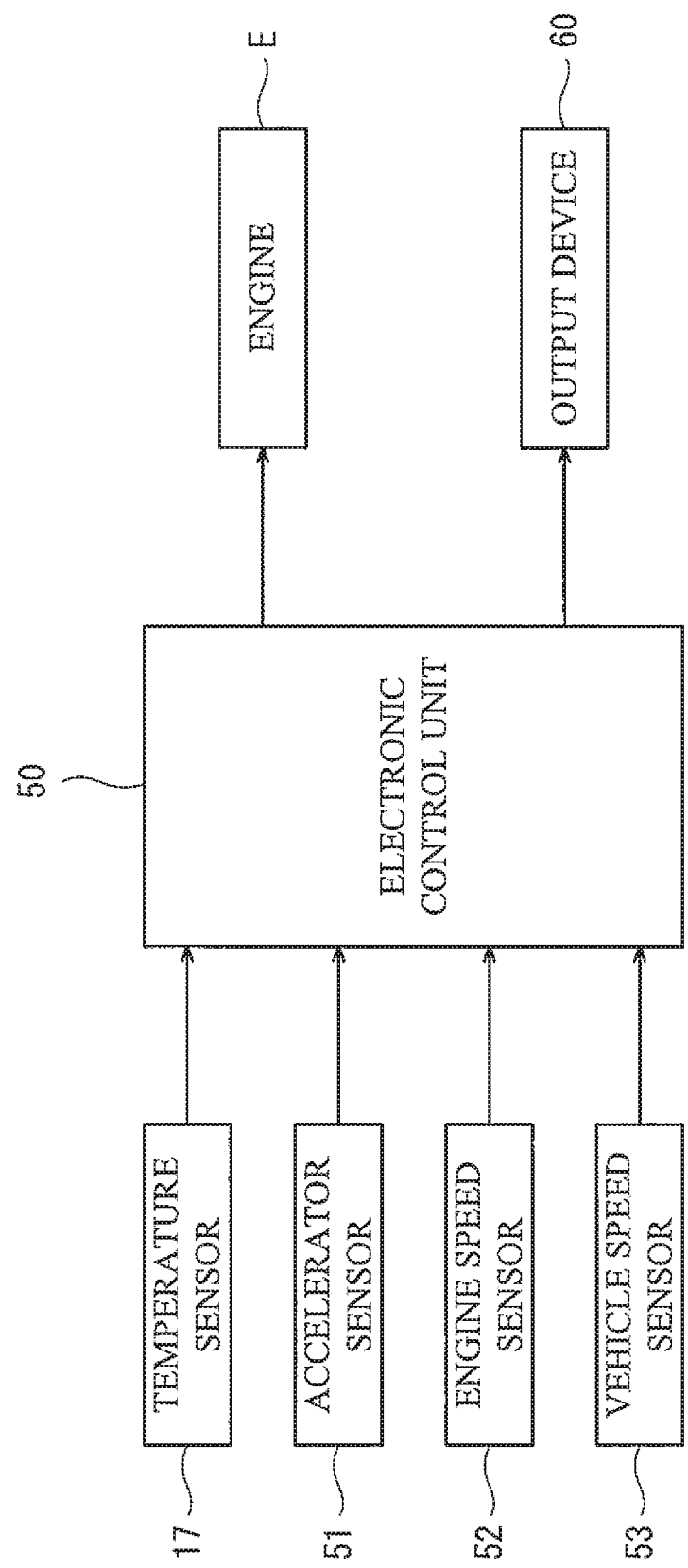
FIG. 6 is a block diagram illustrating a control system of the utility vehicle of FIG. 1.

FIG. 6 is a block diagram illustrating a control system of the utility vehicle 1 of FIG. 1. As shown in FIG. 6, the utility vehicle 1 includes an electronic control unit 50. The electronic control unit 50 includes a processor, a volatile memory, a non-volatile memory, and an I/O interface as hardware components. To the input of the electronic control unit 50 are connected the temperature sensor 17, an accelerator sensor 51, an engine speed sensor 52, and a vehicle speed sensor 53. To the output of the electronic control unit 50 are connected the engine E and an output device 60.

While in the example of FIG. 6 the control unit to which the temperature sensor 17 is connected serves also as an engine control unit, the control unit to which the temperature sensor 17 may be independent of an engine control unit separately provided. A control unit having a different function than engine control units may be the control unit to which the temperature sensor 17 is connected.

The accelerator sensor 51 detects an acceleration demand from the driver of the vehicle (e.g., the amount of operation of an accelerator pedal). The engine speed sensor 52 detects the rotational speed of the crankshaft 19 of the engine E. The vehicle speed sensor 53 detects the travel speed (e.g., the wheel speed) of the utility vehicle 1. The electronic control unit 50 controls the engine E based on detection signals of the accelerator sensor 51, the engine speed sensor 52, and the vehicle speed sensor 53.

The electronic control unit 50 sends to the output device 60 a signal dependent on the temperature detected by the temperature sensor 17. The output device 60 provides a predetermined output to the user in response to the received signal. The output device 60 is, for example, a display device configured to provide visual indication. In this case, the output device 60 may display temperature information dependent on the temperature detected by the temperature sensor 17.

For example, the output device 60 may be configured to display a temperature value or level based on the temperature detected by the temperature sensor 17. The electronic control unit 50 may be configured to, when the temperature detected by the temperature sensor 17 exceeds a predetermined threshold, determine that the belt 26 is overheated and cause the output device 60 to display a warning.

The above configuration allows the user to know whether the belt 26 of the belt continuously variable transmission 13 is overheated, thus prompting the user to take measures (such as replacement of a filter disposed in the intake passage) to prevent a reduction in service life of the belt 26.

The utility vehicle 1 may include a second temperature sensor that detects the temperature of air delivered into the housing 21 to cool the belt 26 (e.g., the ambient temperature of the vehicle body or the temperature of the intake passage S1). In this case, the electronic control unit 50 may determine that the belt 26 is overheated when the amount or rate of increase in the temperature detected by the temperature sensor 17 relative to the temperature detected by the second temperature sensor exceeds a predetermined threshold.

The output device 60 may be a sound device configured to output sounds. The output device 60 may output a sound representing temperature information dependent on the temperature detected by the temperature sensor 17. For example, the output device 60 may be configured to output a sound representing a temperature value or level based on the temperature detected by the temperature sensor 17. The electronic control unit 50 may be configured to, when the temperature detected by the temperature sensor 17 exceeds a predetermined threshold, determine that the belt 26 is overheated and cause the output device 60 to output a warning sound.

The electronic control unit 50 may store the temperature detected by the temperature sensor 17 in the electronic control unit 50 itself or another memory device in the form of a data log. The temperature sensor 17 may be connected directly to the output device without connection to the control unit, and the output device may provide an output dependent on a voltage value of a detection signal of the temperature sensor 17.

The electronic control unit 50 may, when the temperature detected by the temperature sensor 17 exceeds a predetermined threshold, send to the engine E a signal operable to decrease the output of the engine E. That is, upon determining that the belt 26 is overheated based on a detection signal of the temperature sensor 17, the electronic control unit 50 may control the engine E to decrease the torque of the engine E. With this configuration, the belt 26 can be prevented from being overheated due to a high output of the engine E.

Many modifications and other embodiments of the present invention will be apparent to those skilled in the art from the foregoing description. Accordingly, the foregoing description is to be construed as illustrative only, and is provided for the purpose of teaching those skilled in the art the best mode for carrying out the invention. The details of the structure and/or function may be varied substantially without departing from the scope of the invention.

What is claimed is:

1. A utility vehicle comprising:
   a prime mover;
   a belt continuously variable transmission comprising a drive pulley, a driven pulley, a belt wound around the drive pulley and the driven pulley, and a housing forming an accommodation space in which the belt is disposed, the belt continuously variable transmission being configured to change a speed of rotation produced by drive power output from the prime mover;
   a temperature sensor configured to detect a temperature of the belt or a temperature corresponding to the temperature of the belt;
   an intake duct connected to the housing; and
   an exhaust duct connected to the housing, wherein
   the housing includes a dividing wall dividing the accommodation space into a first flow passage and a second flow passage, the first flow passage communicating with an intake passage of the intake duct, the second flow passage communicating with an exhaust passage of the exhaust duct, the second flow passage accommodating the drive pulley, the driven pulley, and the belt;
   the dividing wall is provided with an opening between the first flow passage and the second flow passage; and
   the temperature sensor is configured to detect a temperature of air in the second flow passage.

2. The utility vehicle according to claim 1, further comprising a cooling passage through which air flows to cool the belt, wherein
   the temperature sensor detects a temperature of a portion of the cooling passage, the portion being located downstream of at least a part of the belt in a direction in which the air flows.

3. The utility vehicle according to claim 2, wherein
   the cooling passage comprises the intake passage of the intake duct, the accommodation space of the housing, and the exhaust passage of the exhaust duct, and
   the temperature sensor detects a temperature of the accommodation space or the exhaust passage.

4. The utility vehicle according to claim 1, further comprising an output device configured to provide a predetermined output to a user in response to a detection signal of the temperature sensor.

5. The utility vehicle according to claim 1, further comprising an electronic control unit to which a detection signal of the temperature sensor is input, wherein
   the electronic control unit sends a signal dependent on the temperature detected by the temperature sensor.

6. The utility vehicle according to claim 5, further comprising an output device configured to receive the signal sent by the electronic control unit, wherein
   the output device provides a predetermined output to a user in response to the signal.

7. The utility vehicle according to claim 5, wherein when the temperature detected by the temperature sensor exceeds a predetermined threshold, the electronic control unit sends the signal operable to decrease an output of the prime mover.

8. The utility vehicle according to claim 1, wherein the temperature sensor is mounted on the housing.

9. A utility vehicle comprising:
   a prime mover;
   a belt continuously variable transmission comprising a drive pulley, a driven pulley, a belt wound around the drive pulley and the driven pulley, and a housing forming an accommodation space in which the belt is disposed, the belt continuously variable transmission being configured to change a speed of rotation produced by drive power output from the prime mover;
   an intake duct connected to the housing;
   an exhaust duct connected to the housing; and
   a temperature sensor, wherein
   one of the drive pulley and the driven pulley includes a sheave with an impeller;
   the belt continuously variable transmission further comprises an opening that faces the impeller such that a rotation of the impeller causes air to flow from the opening toward the belt;
   the temperature sensor is configured to detect a temperature of the air downstream of the opening;
   the housing includes a dividing wall dividing the accommodation space into a first flow passage and a second flow passage, the first flow passage communicating with an intake passage of the intake duct, the second flow passage communicating with an exhaust passage of the exhaust duct, the second flow passage accommodating the drive pulley, the driven pulley, and the belt;
   the dividing wall is provided with an opening between the first flow passage and the second flow passage; and
   the temperature sensor is configured to detect a temperature of air in the second flow passage.

* * * * *